United States Patent Office 3,399,226
Patented Aug. 27, 1968

3,399,226
PREPARATION OF PHENYLALANINE
COMPOUNDS
Walfred S. Saari, Lansdale, Pa., assignor to Merck & Co.,
Inc., Rahway, N.J., a corporation of New Jersey
No Drawing. Filed Oct. 22, 1965, Ser. No. 502,284
9 Claims. (Cl. 260—471)

ABSTRACT OF THE DISCLOSURE

Phenylalanines are prepared by contacting a hydroxylated N,N-dialkylbenzylamine with a lower alkyl ester of an α-nitroalkanoic acid, followed by reduction of the nitro group and hydrolysis of the ester to form the α-nitro-α-alkyl-β-(hydroxylated phenyl)propionic acid antihypertensive products.

---

This invention relates to a process for the preparation of α-methyltyrosine and nuclear substituted derivatives thereof.

More particularly, it relates to a novel process for the production of α-alkyl-β-(2- or 4-hydroxyphenyl)alanine and derivatives thereof in which the phenyl ring is further substituted by one or more additional substituents.

Still more particularly, the process of the present invention relates to the conversion of N,N-disubstituted benzylamines by reaction with a lower alkyl ester of an α-nitro lower aliphatic acid to form a novel α-alkyl-α-nitro-β-(o- or p-hydroxyphenyl)propionate ester, reducing said α-nitropropionate ester and hydrolyzing the formed amino ester to produce α-methyltyrosine and substituted derivatives thereof.

The compounds produced by the process of this invention are important intermediates in the production of certain optically active derivatives of phenylalanine. Thus, one of the compounds produced by the process of this invention is α - methyl - β - 3,4 - dihydroxyphenylalanine, which has been shown to be active in reducing blood pressure of warm-blooded animals. The L-isomer of α-methyl-β-3,4-dihydroxyphenylalanine, otherwise known as methyldopa, has been used in the treatment of hundreds of patients suffering from hypertension and, as such, has been sold on a commercial scale for use in such treatment. The racemic α-methyl-β-3,4-dihydroxyphenylalanine produced by the process of the present invention is an intermediate in the preparation of the L-isomer of this compound. Conversion of the racemic compound to the optically active L-isomer can be accomplished by known methods of resolution of racemic mixtures into their optically active components.

The starting materials used in the process of my invention are N,N-dialkylbenzylamines having at least one of the o- or p-positions on the benzene ring substituted by a hydroxy substituent. Thus, the starting material of the present invention can be represented by the formula:

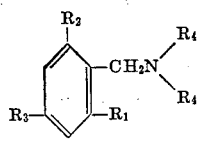

wherein $R_1$, $R_2$ and $R_3$ are each selected from the group consisting of hydrogen, hydroxy, alkoxy, acyloxy, halogen and alkyl, and the $R_4$ substituents are lower alkyl substituents containing from 1 to 6 carbon atoms or alkyl substituents included in a morpholine, piperidine or pyrrolidine ring. The remaining positions on the benzene ring may also be substituted by substituents such as hydrogen, hydroxy, alkoxy, acyloxy, halogen, alkyl, amino, alkylamino and alkylthio.

Preferably, the compounds used as starting materials in the process of my invention are N,N-dialkylbenzylamines or the corresponding quaternary salts which have at least one hydroxyl substituent attached to the o- or p-position of the benzene ring. Preferred compounds for use in the process of my invention, thus, are N,N-dimethyl-4-hydroxybenzylamine as well as the corresponding N,N-diethyl, N,N-dipropyl, N,N-dibutyl, N,N-diamyl, N,N-dihexyl, N-ethyl-N-methyl, N-methyl-N-propyl, the N-ethyl-N-propyl derivatives, N-(4-hydroxybenzyl)morpholine and the corresponding piperidine and pyrrolidine derivatives. Likewise, the corresponding N,N-dialkyl derivatives of 3,4-dihydroxybenzylamine, 2,4-dihydroxybenzylamine, 2,5-dihydroxybenzylamine, 2,6-dihydroxybenzylamine, 2-hydroxybenzylamine and other nuclear substituted derivatives thereof may be used as starting materials in the process of my invention. In addition, the corresponding quaternary ammonium salts are prepared by reaction of the above-mentioned N,N-dialkylbenzylamines with an alkylhalide to form the corresponding N-trialkylbenzylammonium halide. When employing the quaternary ammonium salts as starting materials in the process of my invention, it is preferred to form the quaternary salt directly in the solvent to be used as the reaction medium. Thus, for example, in utilizing N-trimethyl-4-hydroxybenzylammonium bromide as the starting material for the process of my invention, a solution of N,N-dimethyl-4-hydroxybenzylamine in toluene is intimately contacted with an equimolar amount of methylbromide to form the desired solution of trimethyl-4-hydroxybenzylammonium bromide which can advantageously be employed as the starting material for the reaction with the selected α-nitro ester.

In accordance with the process, the N,N-dialkyl, o- or p-hydroxybenzylamine starting material is intimately contacted in a liquid diluent with approximately an equimolar amount of an alkyl ester of a lower aliphatic carboxylic acid having an α-nitro substituent. It is preferred to carry out the reaction in the presence of a small amount of a strong base. Compounds which are satisfactory for this purpose are alkali metal alkoxides such as sodium methoxide, sodium ethoxide and the like. Alkali metal hydroxides such as sodium and potassium hydroxide, metal alkyls such as butyl lithium and hydrides such as sodium and lithium hydride are useful in the condensation of the N,N-dialkylbenzylamine with the α-nitropropionate ester.

The α-nitro ester reactant employed as one of the reactants in the first step of my process is a lower alkyl ester of an α-nitro aliphatic carboxylic acid. For use in my process, I prefer to use an ester of an α-nitro aliphatic carboxylic acid having at least two carbon atoms and up to about 6 carbon atoms. Typical esters which may effectively be employed are methyl-α-nitropropionate, ethyl-α-nitropropionate, propyl-α-nitropropionate, butyl-α-nitropropionate, hexyl-α-nitropropionate, heptyl - α - nitropropionate, and the corresponding alkyl esters of α-nitrobutanoic acid, α-nitropentanoic acid, α-nitrohexanoic acid, as well as the branched chain isomers which contain an α-hydrogen.

A liquid diluent may be employed as the reaction medium. A preferred diluent is a solvent for the reactants and is inert under the conditions of the condensation reaction. Typical examples of such solvents are aromatic hydrocarbons such as toluene, xylene or benzene, toluene being preferred; N,N-dialkylamides such as N,N-dimethylformamide, N,N-dimethylacetamide and tetramethylurea; dimethylsulfoxide; alcohols such as ethanol, methanol, propanol, isopropanol and the like, as well as ethers, e.g., dioxane and tetrahydrofuran, and the like.

The reaction mixture of the benzylamine and nitro ester is maintained at an elevated temperature for a period of from 1 to 12 hours. Under the preferred conditions, using toluene as a solvent for the reaction, the reactants are heated to the reflux temperature for a period of about 8 hours. In this manner, excellent yields of the desired intermediate product are formed and may be recovered by neutralization of the reaction mixture followed by precipitation and filtration of the solid product or by extraction into a suitable solvent.

The intermediate product isolated in this manner is an alkyl ester of an α-nitro-β-(hydroxyphenyl)alkanoic acid. By selection of the appropriate starting materials and reactants, there can be obtained as intermediates ethyl-3-(2-hydroxyphenyl)-2-nitropropionate,
ethyl-3-(3,4-dihydroxyphenyl)-2-nitropropionate,
ethyl-3-(2,4-dihydroxyphenyl)-2-nitropropionate,
ethyl-3-(2,5-dihydroxyphenyl)-2-nitropropionate,
ethyl-3-(2,6-dihydroxyphenyl)-2-nitropropionate,
ethyl-3-(3,4,5-trihydroxyphenyl)-2-nitropropionate,
ethyl-3-(3,5-dimethyl-4-hydroxyphenyl)-2-nitropropionate,
ethyl-3-(2-acetoxy-3,4-dihydroxyphenyl)-2-nitropropionate,
ethyl-3-(3-methoxy-4-hydroxyphenyl)-2-nitropropionate,
ethyl-3-(3-chloro-4-hydroxyphenyl)-2-nitropropionate,
ethyl-3-(2-,6-dichloro-4-hydroxyphenyl)-2-nitropropionate, and
ethyl-3-(2-bromo-4-hydroxyphenyl)-2-nitropropionate.

In a similar manner, the methyl, propyl, butyl, amyl and hexyl esters of the correspondingly substituted butyric, pentanoic, hexanoic and octanoic acids can be prepared.

In the next step of my process, the formed nitro ester is reduced to the corresponding amino ester. In accordance with one embodiment of my invention, the nitro ester is contacted for a brief period of time with a small amount of Raney nickel catalyst, and subsequently hydrogenated in the presence of a metal catalyst to convert the α-nitro group to an α-amino substituent and thus produce, after hydrolysis of the ester function, the desired α-amino-α-alkyl-β-hydroxyphenylpropionic acids which are the products of the process of my invention. A particularly desirable feature of my invention is the pretreatment of the α-nitro ester with Raney nickel catalyst. When this particular treatment is applied to the compounds of my invention, the subsequent catalytic hydrogenation is carried out in excellent yields to obtain a high overall yield of the desired amino ester. The catalyst employed in the hydrogenation is preferably a noble metal catalyst. Such catalysts include platinum oxide as well as platinum or palladium deposited on alumina or charcoal. The reduction under the influence of such catalysts is carried out with great ease and is effected at about room temperature under an atmospheric or slightly greater than atmospheric pressure. The hydrogenation may also be carried out in the presence of other metallic hydrogenation catalysts such as Raney nickel and in this case higher hydrogen pressures and temperatures are employed. Under the preferred conditions of the hydrogenation reaction, the reaction is complete in approximately 10 to 20 hours, whereupon the catalyst is removed by filtration. The filtrate which contains the resulting amino ester is hydrolyzed to the corresponding amino acid with an acid such as aqueous hydrochloric or hydrobromic acid or an alkali such as an aqueous solution of an alkali or alkaline earth metal hydroxide, e.g., sodium hydroxide, potassium hydroxide, barium hydroxide and the like. The desired amino acid is recovered by neutralization of the reaction mixture and filtration. Among the materials which are produced in accordance with the process of my invention are α-methyl-β-(4-hydroxyphenyl)alanine, α-ethyl-β-(4-hydroxyphenyl)alanine, α-propyl-β-(4-hydroxyphenyl)alanine, α-methyl-β-(3,4-dihydroxyphenyl)alanine, α-ethyl-β-(3,4-dihydroxyphenyl)alanine, and α-propyl-β-(3,4-dihydroxyphenyl)alanine as well as the corresponding derivatives of said compounds wherein the benzene nucleus is further substituted by one or more additional hydroxy, alkoxy, acyloxy, halogen, alkyl, amino, alkylamino and alkylthio substituents.

In addition to the catalytic hydrogenation of the nitro ester to the corresponding amino ester, the reduction is also advantageously effected by noncatalytic methods. Thus, the reduction of the nitro group to an amino group is conveniently effected in a liquid reaction medium using a reducing metal such as iron, tin or zinc in an acidic medium such as hydrochloric or acetic acid. In addition, the reduction may be effected by the use of aluminum amalgam under neutral conditions. When the reduction is carried out in a strong acid medium the reduction of the amino group and the hydrolysis of the ester are accomplished substantially simultaneously and the product isolated from the reduction medium is the desired amino acid.

EXAMPLE 1

Ethyl-2-nitro-2-(p-hydroxybenzyl)propionate

A mixture of 2.0 g. (0.0132 mole) of N,N-dimethyl-4-hydroxybenzylamine, 2.0 g. (0.0136 mole) of ethyl α-nitropropionate and 10–20 mg. of 53% sodium hydride in mineral oil in 30 ml. of toluene is heated at reflux. Nitrogen is bubbled through the reaction mixture to remove the dimethylamine which is formed during the reaction. After 8 hours at reflux, the reaction mixture is cooled, washed with dilute hydrochloric acid and water, and dried over anhydrous sodium sulfate. After filtration, the toluene is removed under vacuum to give ethyl-2-nitro-2-(p-hydroxybenzyl)propionate. Distillation at 0.05 mm. gave an analytical sample.

EXAMPLE 2

Other alkyl esters of 2-nitro-2-(hydroxybenzyl)alkanoic acids

In the manner described in Example 1, other 2-nitro esters are prepared using equimolar amounts of an N,N-dialkylhydroxybenzylamine and a lower alkyl ester of a 2-nitroalkanoic acid. The reactants used and the products obtained following the reaction are indicated in the following table.

| N,N-dialkylhydroxy-benzylamine reactants | α-Nitro ester reactants | Product |
|---|---|---|
| N,N-dimethyl-2-hydroxy-benzylamine. | Ethyl-α-nitro-propionate. | Ethyl-2-nitro-2-(2-hydroxybenzyl)propionate. |
| N,N-dimethyl-3,4-dihydroxybenzylamine. | do | Ethyl-2-nitro-2-(3,4-dihydroxybenzyl)-propionate. |
| N,N-dimethyl-2,4-dihydroxybenzylamine. | do | Ethyl-2-nitro-2-(2,4-dihydroxybenzyl)-propionate. |
| N,N-dimethyl-2,5-dihydroxybenzylamine. | do | Ethyl-2-nitro-2-(2,5-dihydroxybenzyl)-propionate. |
| N,N-dimethyl-2,6-dihydroxybenzylamine. | do | Ethyl-2-nitro-2-(2,6-dihydroxybenzyl)-propionate. |
| N,N-dimethyl-4-hydroxybenzylamine. | Ethyl-α-nitro-butyrate. | Ethyl-2-nitro-2-(4-hydroxybenzyl)-butyrate. |
| N,N-dimethyl-3,4-dihydroxybenzylamine. | do | Ethyl-2-nitro-2-(3,4-dihydroxybenzyl)-butyrate. |
| N,N-dimethyl-2,4-dihydroxybenzylamine. | do | Ethyl-2-nitro-2-(2,4-dihydroxybenzyl)-butyrate. |
| N,N-dimethyl-2,5-dihydroxybenzylamine. | do | Ethyl-2-nitro-2-(2,5-dihydroxybenzyl)-butyrate. |
| N,N-dimethyl-2,6-dihydroxybenzylamine. | do | Ethyl-2-nitro-2-(2,6-dihydroxybenzyl)-butyrate. |
| N,N-diethyl-4-hydroxybenzylamine. | Propyl-2-nitro-pentanoate. | Propyl-2-nitro-2-(4-hydroxybenzyl)-pentanoate. |
| N,N-diethyl-3,4-dihydroxybenzylamine. | do | Propyl-2-nitro-2-(3,4-dihydroxybenzyl)-pentanoate. |
| N,N-diethyl-2,4-dihydroxybenzylamine. | do | Propyl-2-nitro-2-(2,4-dihydroxybenzyl)-pentanoate. |
| N,N-diethyl-2,5-dihydroxybenzylamine. | do | Propyl-2-nitro-2-(2,5-dihydroxybenzyl)-pentanoate. |
| N,N-diethyl-2,6-dihydroxybenzylamine. | do | Propyl-2-nitro-2-(2,6-dihydroxybenzyl)-pentanoate. |

EXAMPLE 3

α-Methyltyrosine

A solution of 1.5 g. (0.00594 mole) of ethyl-2-nitro-2-(p-hydroxybenzyl)propionate in 50 ml. of absolute ethanol is heated with a small amount, approximately 0.5 g., of Raney nickel catalyst under reflux for 1 hour. The Raney nickel is then removed by filtraton. Platinum oxide catalyst (0.1 g.) is added to the filtrate which is then hydrogenated in a Parr apparatus at 25–30° and an initial pressure of 20–30 p.s.i. After 20 hours, the theoretical amount of hydrogen has been taken up. The catalyst is removed by filtration, 30 ml. of 6 N hydrochloric acid is added and the solution concentrated under vacuum to remove most of the ethanol. The hydrolysis is completed by heating the aqueous acid solution at 100° for 2 hours. The reaction mixture is concentrated under vacuum, about 10 ml. of isopropanol added to the residue and the mixture reconcentrated to dryness. Twenty ml. of water is added and the pH of the solution adjusted to 5.0–6.0 with diethylamine. After cooling, filtration gives 0.58 g. (50.0%) of α-methyltyrosine, M.P. 312–318° dec. One recrystallization from hot water gives an analytical sample, M.P. 318–320° dec., which is identical with an authentic sample of α-methyltyrosine.

EXAMPLE 4

Substituted phenylalanines

The products of Example 2 are each heated with a small amount of Raney nickel catalyst under reflux for one hour and, in the manner described in Example 3, each of said Raney nickel heated nitro esters is hydrogenated in the presence of platinum oxide catalyst at room temperature at about 2–3 atmospheres of hydrogen pressure and then hydrolyzed to produce the corresponding amino acids, i.e., 2-hydroxy-α-methylphenylalanine, 3,4-dihydroxy - α - methylphenylalanine, 2,4 - dihydroxy-α-methylphenylalanine, 2,5-dihydroxy - α - methylphenylalanine, 2,6-dihydroxy - α - methylphenylalanine, α-ethyltyrosine, 3,4 - dihydroxy - α - ethylphenylalanine, 2,4 - dihydroxy - α - ethylphenylalanine, 2,5 - dihydroxy-α-ethylphenylalanine, 2,6 - dihydroxy - α - ethylphenylalanine, α-propyltyrosine, 3,4-dihydroxy - α - propylphenylalanine, 2,4-dihydroxy - α - propylphenylalanine, 2,5-dihydroxy-α-propylphenylalaline, and 2,6-dihydroxy-α-propylphenylalanine.

What is claimed is:

1. The process which comprises contacting N,N-dialkyl-hydroxybenzylamine with a lower alkyl ester of an α-nitroalkanoic acid to form the lower alkyl ester of α-alkyl-α-nitro-β-hydroxyphenylpropionic acid, reducing said nitro ester to form an ester of an α-amino-α-hydroxybenzylalkanoic acid and hydrolyzing said ester to form an α-alkyl-β-hydroxyphenylalanine.

2. The process which comprises contacting an N,N-dialkylhydroxybenzylamine with a lower alkyl ester of an α-nitroalkanoic acid to produce a lower alkyl ester of α-alkyl-α-nitro-β-hydroxyphenylpropionic acid.

3. The process which comprises contacting a compound of the formula

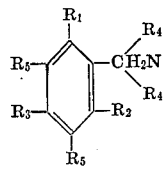

wherein each of the $R_1$, $R_2$ and $R_3$ substituents is a member selected from the group consisting of hydrogen, hydroxy, alkoxy, acyloxy, halogen and alkyl, at least one of said members being an hydroxyl substituent, each of the $R_5$ substituents is a member selected from the group consisting of hydrogen, hydroxy, alkoxy, acyloxy, halogen, alkyl, amino, alkylamino and alkylthio, and the $R_4$ substituents are selected from the group consisting of lower alkyl substituents and lower alkyl substituents joined in a heterocyclic ring selected from the group consisting of morpholine, piperidine and pyrrolidine, with a lower alkyl ester of α-nitroalkanoic acid to form an α-nitro ester of the formula

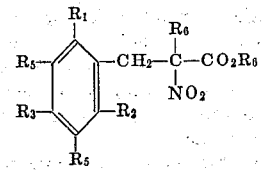

wherein $R_1$, $R_2$, $R_3$ and $R_5$ are as defined above and $R_6$ is a lower alkyl substituent, and subsequently contacting said α-nitro ester with Raney nickel and hydrogenating said nitro ester in the presence of a catalyst selected from the group consisting of a noble metal, Raney nickel, aluminum amalgam and iron, tin or zinc in an acidic medium to form the corresponding amino ester and hydrolyzing said ester to form an amino acid of the formula

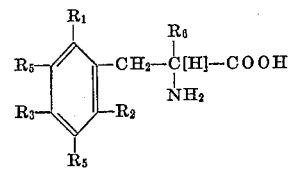

wherein $R_1$, $R_2$, $R_3$, $R_5$ and $R_6$ are as defined above.

4. The process which comprises contacting a compound having the formula

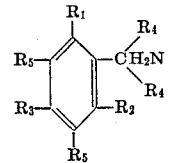

wherein each of the $R_1$, $R_2$ and $R_3$ substituents is a member selected from the group consisting of hydrogen, hydroxy, alkoxy, acyloxy, halogen and alkyl, at least one of said members being an hydroxyl substituent, each of the $R_5$ substituents is a member selected from the group consisting of hydrogen, hydroxy, alkoxy, acyloxy, halogen, alkyl, amino, alkylamino and alkylthio, and the $R_4$ substituents are selected from the group consisting of lower alkyl substituents and lower alkyl substituents joined in a heterocyclic ring selected from the group consisting of morpholine, piperidine and pyrrolidine, with a lower alkyl ester of α-nitroalkanoic acid to produce a compound of the formula

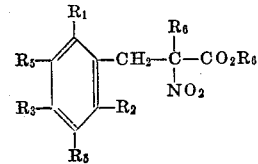

wherein $R_1$, $R_2$, $R_3$ and $R_5$ are as defined above and $R_6$ is a lower alkyl substituent.

5. The process which comprises contacting p-hydroxy-N,N-dialkylbenzylamine with a lower alkyl ester of an α-nitroalkanoic acid to form a lower alkyl ester of α-alkyl-α-nitro-β-(p-hydroxyphenyl)propionate, contacting said alkyl propionate with Raney nickel and catalytically hydrogenating said product in the presence of a catalyst selected from a noble metal and Raney nickel to produce the corresponding amino ester and hydrolyzing said amino ester to produce an α-alkyl-β-(p-hydroxyphenyl)alanine.

6. The process which comprises contacting N,N-dialkyl-p-hydroxybenzylamine with a lower alkyl ester of an α-nitroalkanoic acid in the presence of a catalytic amount of a strong base to form a lower alkyl ester of α-alkyl-α-nitro-β-(p-hydroxyphenyl)propionate.

7. The process which comprises contacting N,N-dialkyl-3-alkoxy-4-hydroxybenzylamine with a lower alkyl ester of an α-nitro alkanoic acid to produce a lower alkyl ester of α-nitro-β-(3-alkoxy-4-hydroxyphenyl)propionic acid, hydrogenating said propionic acid ester in the presence of a catalyst selected from a noble metal and Raney nickel to produce the ester of α-alkyl-β-(3-alkoxy-4-hydroxyphenyl)alanine and contacting said phenylalanine compound with hydrobromic acid to produce an α-alkyl-β-3,4-dihydroxyphenylalanine.

8. The process which comprises contacting N,N-dimethyl-4-hydroxybenzylamine with an equimolar amount of ethyl α-nitropropionate and sodium hydride to produce ethyl 2-nitro-2-(p-hydroxybenzyl)propionate, heating said propionate ester in intimate contact with a small amount of Raney nickel catalyst, separating said Raney nickel catalyst from said propionate ester and hydrogenating said propionate ester in the presence of a platinum oxide catalyst to produce the ethyl ester of α-methyltyrosine which is hydrolyzed with acid or base to form α-methyltyrosine.

9. The process which comprises contacting N,N-dimethyl-3,4-dihydroxybenzylamine with an equimolar amount of ethyl α-nitropropionate and sodium hydride to produce ethyl 2-nitro-2-(3,4-dihydroxybenzyl)propionate, heating said propionate ester in intimate contact with a small amount of Raney nickel catalyst, separating said Raney nickel catalyst from said propionate ester and hydrogenating said 2-nitropropionate ester in the presence of a platinum oxide catalyst to form the corresponding 2-aminopropionate ester and hydrolyzing said ester to form α-methyl-β-(3,4-dihydroxyphenyl)alanine.

References Cited

Organic Chemistry, by Finar (vol. I), 1963, page 565 relied on.

LORRAINE A. WEINBERGER, *Primary Examiner.*

L. A. THAXTON, *Assistant Examiner.*